United States Patent
Quigley et al.

(10) Patent No.: US 8,659,554 B2
(45) Date of Patent: Feb. 25, 2014

(54) TOUCH PAD CONTROL PANEL LOCATED IN THE CENTER CONSOLE OF A VEHICLE

(75) Inventors: Douglas J. Quigley, Rochester, MI (US); Robert Smyczynski, Metamora, MI (US); Clifford Wilkins, Rochester Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1952 days.

(21) Appl. No.: 11/740,989

(22) Filed: Apr. 27, 2007

(65) Prior Publication Data

US 2008/0266265 A1    Oct. 30, 2008

(51) Int. Cl.
*G06F 3/041* (2006.01)

(52) U.S. Cl.
USPC .......... 345/173; 715/700; 296/24.34; 297/56; 297/188.15

(58) Field of Classification Search
USPC .............................. 345/173; 715/700; 297/56
See application file for complete search history.

(56) References Cited

U.S. PATENT DOCUMENTS

| | | | |
|---|---|---|---|
| 6,634,453 B2 | 10/2003 | Arthur et al. | |
| 6,928,350 B2 | 8/2005 | Melnyk et al. | |
| 6,997,494 B2 | 2/2006 | Neumann | |
| 6,997,508 B2 | 2/2006 | Jaaska, Sr. | |
| 7,413,229 B2 * | 8/2008 | Kukucka et al. | 296/24.34 |
| 2005/0230993 A1 * | 10/2005 | Dry | 296/37.8 |
| 2006/0242580 A1 * | 10/2006 | Obradovich | 715/700 |
| 2006/0242671 A1 * | 10/2006 | Vitito | 725/75 |

\* cited by examiner

*Primary Examiner* — Grant Sitta
(74) *Attorney, Agent, or Firm* — Ralph E. Smith

(57) ABSTRACT

The present disclosure provides a moveable touch pad that opens out of a center console armrest and is operable to control a navigation unit or other vehicle functions. Advantageously, locating a control touch pad unit in the center console armrest provides an ergonomically desirable solution for the vehicle's driver. The touch pad can be stored in the vehicle's center console armrest, and the touch pad is configured to move fore and aft for comfortable driver access. Additionally, the control touch pad unit can be utilized to control other vehicle functions, such as audio, climate settings, odometer settings, lighting, mobile phones, and the like.

12 Claims, 3 Drawing Sheets

TOUCH PAD CONTROL PANEL LOCATED IN THE CENTER CONSOLE OF A VEHICLE

FIELD OF THE INVENTION

The present disclosure relates generally to a vehicle navigational unit control panel, and more specifically to a moveable touch panel located in a deployable portion of a center console armrest operable to control a vehicle's navigational unit and other vehicle functions.

BACKGROUND OF THE INVENTION

Modern vehicles are typically equipped with advanced display units, such as in the vehicle's dashboard at the center console with associated controls distributed throughout the dashboard. For example, navigation systems are becoming a common feature in vehicles with the commercialization of the Global Positioning System (GPS). These navigation systems use position data to locate the user on a road in the unit's map database. Using the road database, the unit can give directions to other locations along roads also in its database. These navigation systems require user input to set location, coordinates, destinations, and the like. Traditionally, the user input is done on the navigation unit itself, such as through a touch screen or buttons adjacent to or on the unit. Navigation systems are typically located in the center of the dashboard, providing both display and input means to access the system. Disadvantageously, the center of the dashboard is not ergonomic for a driver to perform user input, but the display location is ideal for viewing by both the driver and passenger and for not interfering with other dashboard functions.

Additionally, other vehicle controls, such as climate settings, audio settings, odometer, cruise control settings, mobile phones, and the like, are located at various locations on the vehicle dashboard. Some vehicles have incorporated controls within the steering wheel to provide a more ergonomically desirable location. For example, the steering wheel can include audio controls, temperature controls and the like. The various controls can be located at more than one location. For example, audio controls can be on the steering wheel and on an audio unit in the dashboard.

Armrest assemblies including pivoting and rotating display screens are known in the art, such as in U.S. Pat. No. 6,746,065 to Chan, U.S. Pat. No. 6,997,494 to Neumann, and U.S. Pat. No. 6,997,508 to Jaaska, Sr. Touch screens are known and have been incorporated into vehicle control systems, such as in U.S. Pat. No. 6,928,350. However, these references fail to disclose or suggest a moveable touch panel located in an ergonomically desirable location for a driver to operate various vehicle functions, such as a navigation unit.

BRIEF SUMMARY OF THE INVENTION

In various exemplary embodiments, the present disclosure provides a moveable touch pad that opens out of a deployable portion of a center console armrest and is operable to control a navigation unit or other display means within the vehicle. Advantageously, locating a control touch pad unit in the center console armrest provides an ergonomically desirable solution for the vehicle's driver. The touch pad can be stored in the vehicle's center console armrest, and the touch pad is configured to move fore and aft for comfortable driver access. Alternatively, the touch pad is configured to pivot once deployed from the center console, or deploy by ejecting a screen from the center console. Additionally, the control touch pad unit can be utilized to control other vehicle functions, such as audio, climate settings, odometer settings, lighting, mobile phones, and the like.

In an exemplary embodiment of the present disclosure, a moveable touch panel located at a center console of a vehicle includes a touch panel located on an interior surface of a deployable portion of the center console, wherein the deployable portion is connected to the center console through a hinge operable to allow the deployable portion to open from the center console, and the touch panel is configured to accept user input for a display unit located in a dashboard. Optionally, the touch panel is configured to move fore and aft about the hinge for comfortable driver access to the touch panel. Alternatively, the touch panel is configured to pivot about the hinge for comfortable driver access to the touch panel. The display unit includes a navigation unit, and the touch panel is operable to receive user input to control the navigation unit. Optionally, the touch panel includes a control pad operable to control one or more of navigation unit, audio controls, climate settings, odometer settings, lighting, and mobile phones. Alternatively, the touch panel includes a Bluetooth connection.

In another exemplary embodiment of the present disclosure, a vehicle including a moveable touch panel operable to control a display unit includes a center console located between a driver's seat and a passenger's seat including a deployable portion, wherein the deployable portion is connected to the center console with a hinge, a display unit located on a dashboard, and a touch panel located on an interior side of the deployable portion, wherein the touch panel is operable to control the display unit. Optionally, the deployable portion is configured to move fore and aft about the hinge for comfortable driver access to the touch panel. Alternatively, the deployable portion is configured to pivot about the hinge. The display unit includes a navigation unit, and the touch panel is operable to receive user input to control the navigation unit. Optionally, the touch panel includes a control pad operable to control one or more of navigation unit, audio controls, climate settings, odometer settings, lighting, and mobile phones. Alternatively, the touch panel includes a Bluetooth connection.

BRIEF DESCRIPTION OF THE DRAWINGS

The present disclosure is illustrated and described herein with reference to the various drawings, in which like reference numbers denote like system components, respectively, and in which.

DETAILED DESCRIPTION OF THE INVENTION

In various exemplary embodiments, the present disclosure provides a moveable touch pad that opens out of a deployable portion of a center console armrest and is operable to control a navigation unit or other display means within the vehicle. Advantageously, locating a control touch pad unit in the center console armrest provides an ergonomically desirable solution for the vehicle's driver. The touch pad can be stored in the vehicle's center console armrest, and the touch pad is configured to move fore and aft for comfortable driver access. Alternatively, the touch pad is configured to pivot once deployed from the center console, or deploy by ejecting a screen from the center console. Additionally, the control touch pad unit can be utilized to control other vehicle functions, such as audio, climate settings, odometer settings, lighting, mobile phones, and the like.

Modern vehicles include numerous systems and controls relating to various functions, such as climate control, audio, trip settings, navigation, lighting, mobile phones, and the like. These controls are generally distributed along the dashboard and throughout the vehicle. For example, each seat can include seat adjustment controls, and each light can include a button operable for turning on/off the light. Also, the dashboard can include audio controls located adjacent to the audio system, navigation inputs adjacent to or on a navigation unit, and the like.

The present disclosure provides a moveable touch panel located at the center console between a driver's seat and a passenger's seat. The touch pad deploys from within the center console of the vehicle. This touch pad is operable to provide a single user input interface for various vehicle functions. The touch pad can be used in conjunction with other user input interfaces located on the dashboard, steering wheel, and the like. For example, the touch pad can provide another user input interface along with the other interfaces located throughout the vehicle.

Figure 1:
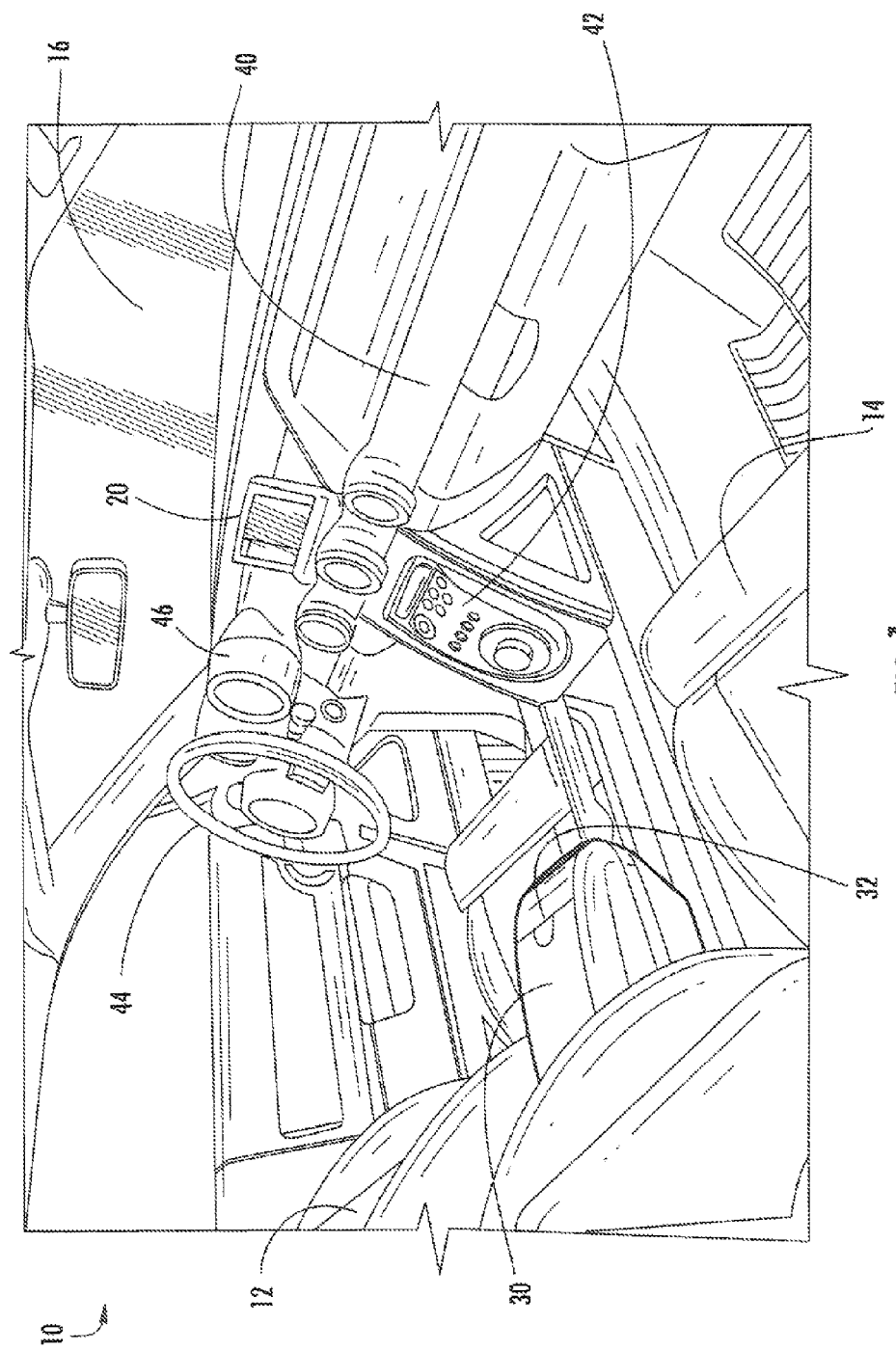
FIG. 1 illustrates a perspective view of the interior of a vehicle equipped with a navigation unit display and center console armrest.
Figure 2:
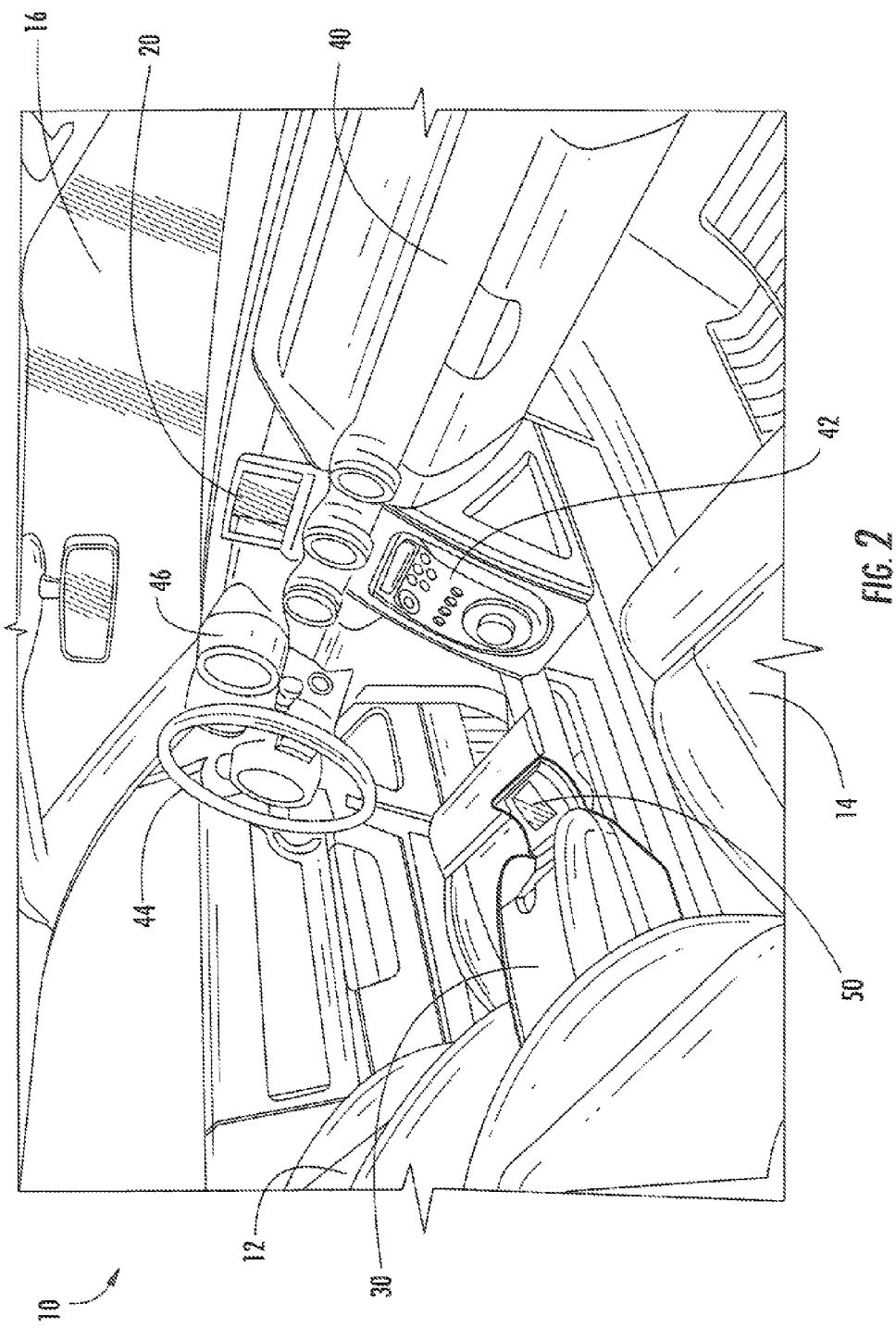
FIG. 2 illustrates a perspective view of the interior of a vehicle equipped with a navigation unit display and a pivotably mounted control panel located within a center console armrest.
Figure 3:
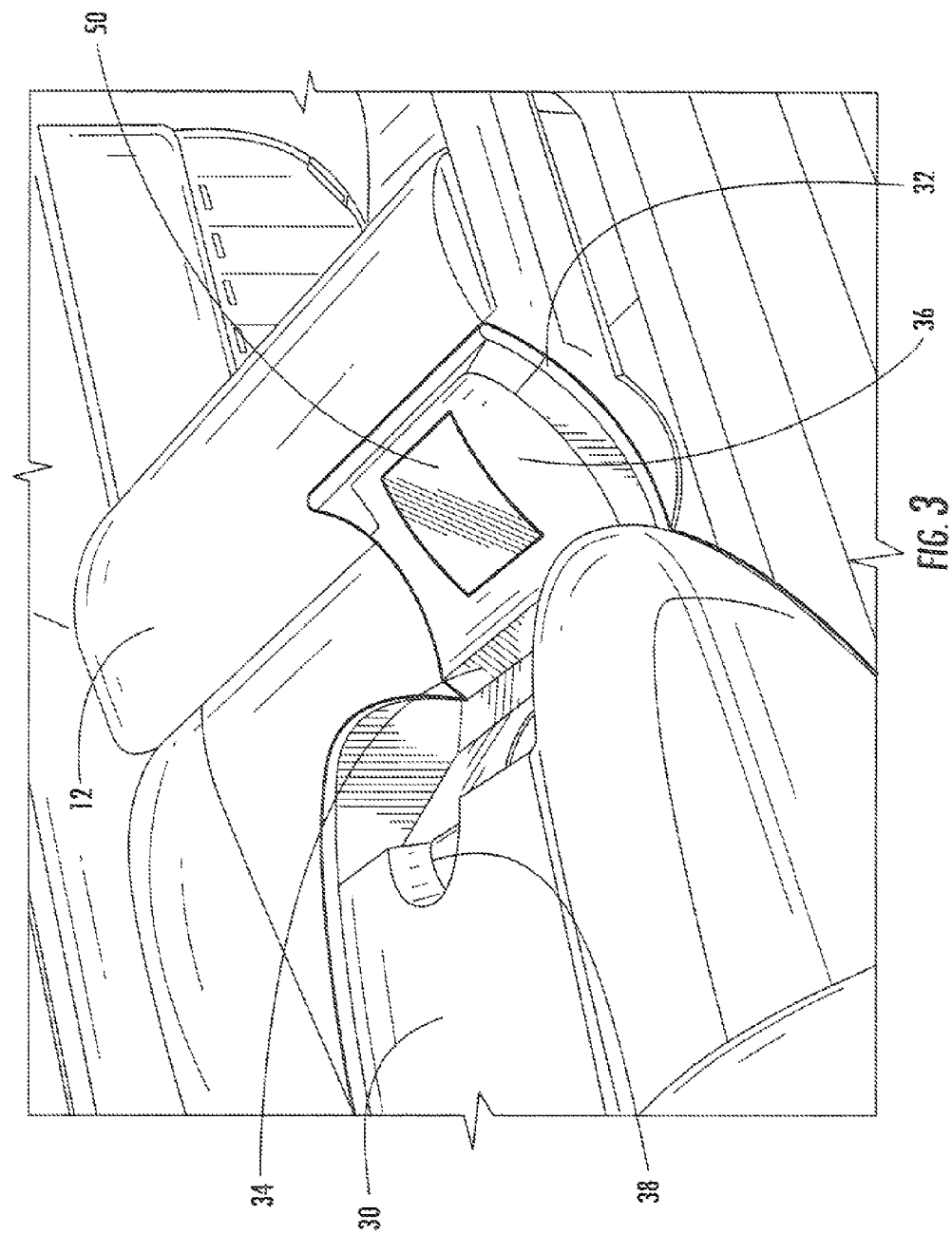
FIG. 3 illustrates a perspective view of a pivotable mounted control panel located within a center console armrest.

Referring now to FIGS. 1 through 3, a vehicle interior 10 includes a driver's seat 12, a passenger's seat 14, and a dashboard 40. The dashboard 40 is a control panel located under a front windshield 16, and it contains indicators and dials 46, controls 42, and a steering wheel 44. The indicators and dials 46 can include a speedometer, odometer, vehicle status, and the like. The controls 42 can include audio controls (e.g., radio, compact-disc, and the like), climate settings, display unit controls, navigation unit controls, and the like. Optionally, the steering wheel 44 can include buttons and knobs to also provide some of the same functionality as the controls 42.

The dashboard 40 can also include a display unit 20, such as a liquid crystal display (LCD) or the like. The display unit 20 can display navigational information, audio settings, trip information, vehicle information, and the like. Additionally, subject to adequate safety precautions, the display unit 20 can also display entertainment, such as movies or television through a digital video disc (DVD), wireless transmission, or the like, and Internet access, such as wireless-based Internet access. The display unit 20 can be a GPS navigational system operable to plan trips, locate destinations, and provide directions. Additionally, the display unit 20 can operate as a navigation system as well as providing other functions.

A center console 30 is located between the driver's seat 12 and the passenger's seat 14. The center console 30 is typically referred to as the area beginning in the dashboard 40 and continuing beneath it, and merging with the transmission tunnel which runs between the driver's and passenger's seats 12 and 14. The center console 30 can include a wide variety of storage compartments, cup holders, and the like. Further, the center console 30 can serve as an armrest for both the driver's and passenger's seats 12 and 14. FIG. 1 illustrates the center console 30 with a deployable portion 32 closed within the center console 30. The deployable portion 32 is an opening in the center console 30 which allows access to the interior of the center console 30. For example, the center console 30 can include storage in the interior.

Referring specifically to FIG. 2, the deployable portion 32 is illustrated in the open position, and containing a touch panel control pad 50. The touch panel control pad 50 is configured to provide a single point of control for the display unit 20 and other vehicle functions. For example, the control pad 50 can be utilized to provide user input to a navigation system which is displayed in the display unit 20. Additionally, the control pad 50 can incorporate other controls, such as the controls 42. The control pad 50 can provide a single control pad for various vehicle systems including navigation, audio, climate, trip settings, lighting, seat adjustment, mobile phones, and the like.

Touch panels are display overlays which have the ability to display and receive information on the same screen. The effect of such overlays allows a display to be used as an input device, removing buttons and the like as the primary input device for interacting with the display's content. Touch panels of the present disclosure can include any touch panel technology, such as resistive, surface wave, capacitive, infrared, strain gauge, optical imaging, dispersive signal technology, acoustic pulse recognition and the like.

A resistive touch panel is coated with a thin metallic electrically conductive and resistive layer that causes a change in the electrical current which is registered as a touch event and sent to the controller for processing. Some resistive panels can estimate the area (and hence the pressure) of a touch based on calculations from the resistances. Resistive touch panels are generally more affordable but offer only reduced clarity and the layer can be damaged by sharp objects. Resistive touch panels are not affected by outside elements such as dust or water and are the type most commonly used today. Other technologies for the touch panel, including those referred to in the preceding paragraph, are also contemplated by the present disclosure.

Referring specifically to FIG. 3, the touch pad control pad 50 is shown located on an interior surface 36 of the deployable portion 32. In an exemplary embodiment, the deployable portion 32 attaches to the center console 30 through a hinge 34. The deployable portion 32 is secured to the center console 30 when closed through a locking connection or the like. Additionally, the deployable portion 32 is configured with a seal to prevent liquids and the like from entering the interior of the center console when the deployable portion 32 is in the closed position.

The hinge 34 allows the deployable portion 32 to open and close within the center console 30. Additionally, the hinge 34 allows the deployable portion 32 to extend outward from the center console 30, and move fore and aft allowing the control pad 50 to be positioned for access by either the driver's or passenger's seat 12 and 14. Advantageously, the control pad 50 is movable fore and aft to provide comfortable driver access. For example, the deployable portion 32 is opened (i.e., flipped out of the center console 30), and adjusted fore-aft as required for driver access.

In another embodiment, the hinge 34 allows the deployable portion 32 to pivot once in the open position. For example, the deployable portion 32 is opened, and once fully extended outward, operable to pivot in any direction to provide comfortable driver access. In yet another embodiment, the control pad 50 is configured to eject from the center console 30, and pivot about the hinge 34 once fully ejected. The present disclosure also contemplates additional deployment means from the center console as are known in the art.

In an exemplary embodiment, the touch panel control pad 50 is a soft pad made of rubber or similar rubberized material located on the interior surface 36 of the deployable portion 32. The soft pad receives input from the fingertip to activate the display unit 20. The soft pad can cover most or some of the interior surface 36. Further, the soft pad can be fit within the deployable portion 32. For example, the soft pad can fit within a recess portion on the interior surface 36 of the deployable portion 32. Alternatively, the soft pad can mount on the interior surface 36.

Additionally, the control pad 50 includes wiring (not shown) connected between the soft pad and the display panel 20. For example, the wiring can route from within the deployable portion 32 through the hinge 34 and then from the center console 30 to the display panel 50. In another embodiment, the control pad 50 can utilize a wireless connection, such as Bluetooth, to communicate to the display panel 50.

In another embodiment of the present disclosure, rear seats of the vehicle also include a center console similar to the center console 30 in the front of the vehicle. Advantageously, the center console between the rear seats can also include the control pad 50. For example, the control pad 50 in the rear can be used to operate display screens located in the rear, such as on the rear seats.

The touch panel control pad 50 of the present disclosure can also be utilized to control wireless phones, Internet access, and the like. For example, a wireless phone can operate through Bluetooth (IEEE 802.15.1) to communicate and be controlled by the display unit 20 and control pad 50. In another example, the control pad 50 can be utilized for user input to the display unit 20 for mobile Internet access in the vehicle. Here, the touch panel control pad 50 can provide a keyboard and/or mouse input to allow a user to navigate the Internet. The touch panel control pad 50 can be utilized to control any Bluetooth enabled device.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A moveable touch panel located at a center console of a vehicle, comprising:
    a touch panel located on an interior surface of a deployable portion of the center console;
    wherein the deployable portion is connected to the center console through a hinge operable to allow the deployable portion to open from the center console by rotating towards the front of the vehicle; and
    wherein the touch panel is configured to accept user input for a display unit located in a dashboard.

2. The moveable touch panel of claim 1, wherein the touch panel is configured to move fore and aft about the hinge for comfortable driver access to the touch panel.

3. The moveable touch panel of claim 1, wherein the touch panel is configured to pivot about the hinge for comfortable driver access to the touch panel.

4. The moveable touch panel of claim 1, wherein the display unit comprises a navigation unit, and wherein the touch panel is operable to receive user input to control the navigation unit.

5. The moveable touch panel of claim 1, wherein the touch panel comprises a control pad operable to control one or more of navigation unit, audio controls, climate settings, odometer settings, lighting, and mobile phones.

6. The moveable touch panel of claim 1, wherein the touch panel comprises a Bluetooth connection.

7. A vehicle comprising a moveable touch panel operable to control a display unit, comprising:
    a center console located between a driver's seat and a passenger's seat comprising a deployable portion, wherein the deployable portion is connected to the center console with a hinge so that the deployable portion opens by rotating towards the front of the vehicle;
    a display unit located on a dashboard; and
    a touch panel located on an interior side of the deployable portion, wherein the touch panel is operable to control the display unit.

8. The vehicle of claim 7, wherein the deployable portion is configured to move fore and aft about the hinge for comfortable driver access to the touch panel.

9. The vehicle of claim 7, wherein the deployable portion is configured to pivot about the hinge.

10. The vehicle of claim 7, wherein the display unit comprises a navigation unit, and wherein the touch panel is operable to receive user input to control the navigation unit.

11. The vehicle of claim 7, wherein the touch panel comprises a control pad operable to control one or more of navigation unit, audio controls, climate settings, odometer settings, lighting, and mobile phones.

12. The vehicle of claim 7, wherein the touch panel comprises a Bluetooth connection.

* * * * *